Dec. 3, 1968     MASAKUNI KANAI     3,414,497
METHOD OF CLARIFYING A POLLUTED AQUEOUS LIQUID
Filed July 7, 1967

INVENTOR.
MASAKUNI KANAI
BY
McGlew & Toren
ATTORNEYS

United States Patent Office 3,414,497
Patented Dec. 3, 1968

3,414,497
METHOD OF CLARIFYING A POLLUTED AQUEOUS LIQUID
Masakuni Kanai, No. 1051 Wadahoncho, Suginami-ku, Tokyo, Japan
Continuation-in-part of application Ser. No. 502,799, Sept. 28, 1965. This application July 7, 1967, Ser. No. 651,798
Claims priority, application Japan, Oct. 5, 1960, 35/40,262; June 29, 1961, 36/22,732
10 Claims. (Cl. 204—149)

ABSTRACT OF THE DISCLOSURE

A method of clarifying a polluted aqueous liquid, such as sewage, by removing turbidity therefrom by iontophoresis, is disclosed, in which a pair of electrodes are positioned in spaced relation in the polluted aqueous liquid and a source of D.C. potential is connected across the electrodes. A fluoride compound is added to the liquid between the electrodes, a preferred fluoride compound being CaF. The potential applied between the electrodes is at least equal to the decomposition potential of the fluoride compound in water to promote the dissociation of CaF into positive calcium ion and negative fluoride ion. The fluoride ions migrate toward thte positive electrode and react with organic and inorganic substances in the liquid to form highly polarized, relatively solid compounds which tend to settle and leave substantially clear water. The calcium ion, for example, will migrate toward the negative electrode. The fluoride will unite, for example, with silica to form $SiF_4$, resulting in mud and pure water.

The positive electrode may be a metal capable of forming hydrides which may be perciptiated, an example of the metal being aluminum. The positive electrode is coated with a pulverulent material such as compounds of silicon, lead, barium and calcium and these may be retained in the fine mesh fibrous container serving as a permeable membrane. The negative electrode may be enclosed with materials such as sodium fluoride or other fluoride compounds and with additional ingredients, such as iodine compounds. The positive ion serves to coagulate negative ions of organic and inorganic substances. The method is characterized by great economy in the use of electricity.

Cross-reference to related applications

This application is a continuation-in-part of application Ser. No. 502,799, filed Sept. 28, 1965, now abandoned. Application Ser. No. 502,799 is in turn a continuation-in-part of application Ser. No. 140,296, filed Sept. 25, 1961, now abandoned.

Background of the invention

It is know to add fluorine or fluoride compounds to already potable drinking water, such additions being made for the purpose of enhancing the resistance to decay of the teeth of people drinking the water. The addition is not made for the purpose of clarifying or purifying the water, as the water is already clarified or purified before the flourine or the fluoride compound is added thereto, generally to an extend such that the additive is less than 1 part per million of the water.
It is also known to treat raw or polluted water to clarify or purify the same, and this has been effected generally either by an electrolysis method or by the use of coagulants. Known methods of this type are, however, very expensive from the standpoint of electrical consumption and time-consuming as well as only partially effective in the case of the use of coagulants.

Summary of the invention

The invention relates to the purification or clarification of polluted aqueous liquid and, more particuarly, to a novel, improved and more efficient purification or clarification method involving iontophoreis utilizing additive compounds which, under the application of a relatively low dissociation potential thereacross, dissociate into positive and negative ions which react with impurities in the polluted aqueous liquid to form compounds or coagulates of a relatively solid nature and which tend to settle rapidly out of the polluted water, thus leaving clear or pure water.

In the method of the invention, a pair of electrodes are immersed into the polluted aqueous liquid in preselected spaced relation to each other, and a fluoride compound is added to the liquid. A unidirectional potential, at least equal to the decomposition or dissociation of the fluoride compound in water, is applied between the electrodes. The fluoride compound thereupon dissociates in the liquid, with the potential between the electrodes promoting this dissociation. In turn, the dissociation of the fluoride compound provides fluoride ions migrating to the positive electrode, and these fluoride ions react with organic and inorganic substances in the liquid to form highly polarized relatively solid compounds which tend to settle, leaving substantially clear water.

The fluoride compound may be introduced into the water between the electrodes or, alternativetly, the positive electrode may be packed with a pulverulent material comprising, as a principal constituent, potassium and compounds thereof, and, as an additional constituent, a material selected from the group consisting of compounds of lead, barium and silicon. This packing is enclosed in a permeable fine-mesh fibrous container. Additionally, the fluoride compound may be immersed in the liquid by packing it around the negative electrode and enclosed in the permeable fine mesh fibrous container. In this case, the fluoride may comprise sodium fluoride alone or sodium fluoride as a principal ingredient with an iodide as a second ingredient.

The invention is applicable to clarifying any type of polluted aqueous liquid, such as sewage, river water, industrial waste liquid, and excretion, by precipitation using the phenomenon of iontophoresis.

An object of the present invention is to provide a method of coagulating and precipitating the turbidity by iontophoresis.

Another object of the invention is to provide a method of effectively coagulating turbidity of polluted aqueous liquid in a simple manner by adding ionizable fluoride compounds to the liquid and subjecting the compounds to an unidirectional voltage at least equal to the dissociation potential of the compound in water.

A further object of the invention is to provide a method of clarifying or purifying polluted aqueous liquid requiring only a very small quantity of chemicals.

Still another object of the invention is to provide such a method using electric power and wherein the electric power consumption is comparatively very low.

A further object of the invention is to provide such a method which may be practiced in a simple manner and at a very low cost.

Brief description of the drawings

For an understanding of the principles of the invention, reference is made to the following description of typical embodiments thereof as illustrated in the accompanying drawings.

In the drawings.

*Description of the preferred embodiments*

Figure 1:
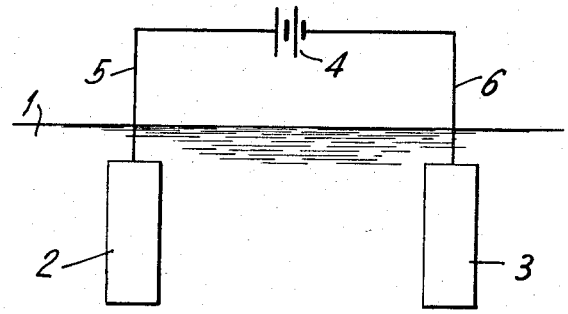
FIG. 1 is a schematic illustration of one embodiment of the invention.

Referring first to FIG. 1, metal plate electrodes 2 and 3 are immersed in polluted aqueous liquid 1, which latter may be, for example, sewage, river water, industrial waste liquids, and excretions. The polluted aqueous liquid 1 is to be clarified or purified by the method of the invention. Electrodes 2 and 3 are connected to opposite terminals of a suitable source of unidirectional potential, illustrated as a battery 4, by means of respective leads 5 and 6 so that a potential may be applied through the polluted aqueous liquid between the electrodes 2 and 3.

A fluoride ion liberating compound is immersed in liquid 1 for liberation of ions into the liquid under the potential applied between electrodes 2 and 3. The potential applied between the electrodes 2 and 3 is at least equal to the electrolytic dissociation potential of the fluoride compound in water. The fluoride compound may be contained in a semi-permeable membrane bag, preferably above 300 mesh resin fiber, for example. Also, the fluoride ion liberating compound may be, for example, lithium fluoride, potassium fluoride, calcium fluoride, sodium fluoride, or tin fluoride.

The fluoride compound placed in the aqueous liquid tends to decompose, dissolve, or dissociate, the decomposition of dissociation being promoted or accelerated by the decomposition potential applied between electrodes 2 and 3 and thus across the fluoride compound. The potential applied between electrodes 2 and 3 is at least equal to the decomposition potential of the particular fluoride compound being used, in water. For example, in the case of calcium fluoride, decomposition will occur at about 2.8 volts. In such case, the potential applied between electrodes 2 and 3 is made sufficiently high that the potential actually acting or effective across the calcium fluoride is at least 2.8 volts.

As the fluoride compound decomposes or dissociates, the positive ion, such as the potassium ion or the calcium ion, for example, will migrate toward the negative electrode and the fluoride ion, which is negative, will migrate to the positive electrode. The negative fluoride ion unites with solids in the liquid to form compounds which tend to settle or the like. For example, the fluoride ion will react with $SiO_2$ and $SiO_2 \cdot nH_2O$ to form $SiF_4$, resulting in mud and pure water. The solids tend to settle, leaving pure water.

In addition, sludge, produced by colloids formed by protein bonding with water, is eliminated. The inorganic substances are ionized and, as a result, the protein is deprived of its bond water by the electrolysis of the liquid 1. As electric current flows through liquid 1 between electrodes 2 and 3 due to the potential applied across the electrodes, inorganic ions will be produced and the mud or turbidity will disappear. With respect to the reaction referred to just above, since, in the reaction wherein protein particles combine with each other, $F^-$ is particularly active, the presence of the fluoride ions is most significant. In either case, the colloid is separated into free water and $SiO_2$ or protein.

This may be compared with a simple reaction of colloid with HF. Because HF is completely ionized naturally, on reaction thereof with colloid including $SiO_2$ or protein, with the HF simply placed into the polluted water and without any passage of electric current therethrough, gas is evolved as represented in the following reaction:

$$SiO_2 + 4HF = SiF_4\uparrow + 2H_2O$$

Hence, a method of purifying polluted water by simply adding thereto HF without application of the potential between a pair of electrodes and across the HF has only limited application due to the danger of evolving $SiF_4$ as a gas.

While the electric current consumption is very low, the operating expense of the invention method can be even further and greatly reduced by utilizing off-peak electric power, for example, at night.

Figure 2:
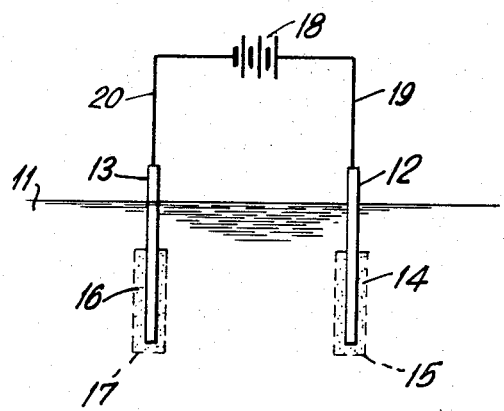
FIG. 2 is a schematic illustration of the second embodiment of the invention.

In the embodiment of the invention illustrated in FIG. 2, a positive electrode 12 and a negative electrode 13 are placed, in spaced relation with each other, in a polluted aqueous liquid 11 to be treated. Positive electrode 12 may comprise a metal, for example aluminum, capable of forming hydrides, which may be precipitated. Conversely, negative electrodes 13 may be formed of any desired metal.

Positive electrode 12 is coated, in accordance with the invention, with a pulverulent material 14 comprising, as a princpal ingredient, potassium compounds and, as additional ingredients, compounds of silicon, lead, barium and calcium. The pulverulent material may be retained in a fine mesh fibrous container 15, of above 300 mesh, serving as a permeable membrane.

Negative electrode 13, which may be, by way of example, a copper plate, is laterally enclosed with pulverulent material 16, comprising, as a main ingredient, sodium fluoride or other fluoride compounds and, as additional ingredients, iodine compounds, such as potassium iodide. These compounds may be retained in a fibrous mesh material 17, above 300 mesh, acting as a permeable membrane-type container.

Electrodes 12 and 13 are connected to opposite terminals of a source of D.C. potential 18 with respective leads 19 and 20. Source 18 impresses, between electrodes 12 and 13, a potential at least equal to the decomposition potential of the fluoride compounds included in the pulverulent material 16. Thus, the aforementioned dissociation or decomposition of the fluoride compounds takes place, with the dissociation or dissolution being accelerated or promoted by the potential acting between electrodes 12 and 13. An electric current, which may range from a few milliamperes to several hundredths of an ampere per liter of liquid, flows through the polluted liquid 11. Under the influence of the applied electric potential, $Ca^{++}$, $Pb^{++}$ and $Ba^{++}$ migrate from positive electrode 12 toward negative electrode 13. Al ions also migrate from electrode 12 toward negative electrode 13. As these ions pass through polluted liquid 11, they tend to coagulate organic and inorganic substances. In particular, $Ca^{++}$ serves to coagulate negative ions of organic and inorganic substances, such as, for example, $SO_4^{--}$, $Cl^-$, $CO_3^{--}$. The Al, Pb and Ba ions serve to precipitate inorganic ions. The fluoride ions effect coagulation of organic substances, such as protein, adjacent negative electrode 13. Iodide ions react with aliphatic organic substances to alter the properties of the latter, thereby providing a secondary precipitating reaction. In the embodiment of the invention shown in FIG. 2, precipitation of organic substances, such as protein, is even further promoted, thereby increasing the efficiency of clarifying the polluted aqueous liquid 11. As the required electric power is low, and as the process is simple, it may be performed economically and at an extremely low cost.

As a practical example, the purifying method of the invention has been practiced in Todoroki Valley in the city of Tokyo, to clarify river water, and is now continuously in operation. The results are summarized as follows:

|  | COD | BOD | Bacteria | Smell | Transparency |
|---|---|---|---|---|---|
| Original water | 20-30 | About 20 | $10^6$–$10^7$ | Smell of sewage. | 3-8 |
| Purified water | 2-7 | About 5 | $10^0$ | None | Over 30 |

In the above table, the expression "COD" is an abbreviation for "chemical oxygen demand," i.e., the titration amount of KMnO₄; the bacteria is given as the number per ccm. or milli-liter; and "Transparency" is measured on the Japanese Industrial Standardization Scale (CJIS) which grades transparency by numerical values from 0 to 30. The expression "BOD" means biochemical oxygen demand" or "bacterial oxygen demand," and is the p.p.m. of oxygen, consumed in water by bacteria during a five day period.

The flow in the river is about 50,000 tons per day and, with this flow, the operating cost is 1.5 yen per ton. The clarifying effect is decreased by more than 50% when the potential applied between the electrodes is below the decomposition potential (2.8 volts) of CaF₂, used as the fluoride in the process. The chemical oxygen demand of the original sewage is 34.0 and, when treated without fluoride, the chemical oxygen demand is reduced to 28.6 With the process of the invention, applying at least a decomposition potential of the fluoride compound between the electrodes, the chemical oxygen demand is reduced to 3.50. The calcium fluoride is added in a range of 10–100 parts per million parts of water, with a normal range of 10–30 p.p.m.

Figure 3:
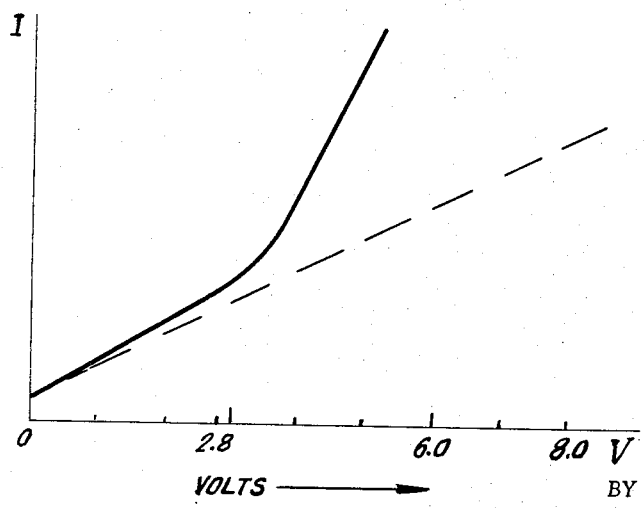
FIG. 3 is a voltage-current (V–I) diagram illustrating the substantial reduction in power requirements with the invention method.

Referring now to FIG. 3, the curve shown therein is a voltage-current curve, representing the current in amperes flowing through a liquid in accordance with the voltage impressed between a pair of electrodes. In obtaining the data for the curve of FIG. 3, a pair of platinum electrodes were used, and it will be noted that the current through water, without any calcium fluoride added thereto, is represented by the dash line and there is a direct ratio between the applied voltage and the current flow. However, and as will be noted by the solid line curve, when calcium fluoride is added to the water, the current flow is suddenly increased in the neighborhood of 2.8 volts (D.C.). This indicates that the current carriers are suddenly increased at the 2.8 volt point.

The reaction between calcium and fluoride is a reversible one, as indicated by the following formula:

Specifically, when the potential is increased to 2.8 volts or above, the fluoride ion is produced from CaF₂.

Sodium fluoride is higher in price than CaF₂, namely about 4 times the price of CaF₂. Sodium fluoride is dangerous to handle as it dissolves in water even without application of an electric potential, and is harmful to humans. For example, the fluoride content allowable in drinking water, under fluoridation procedures, is less than about 1 p.p.m. When sodium fluoride is added to sewage, it combines with calcium to produce the colloid state of calcium fluoride. Upon this occurring, if the calcium fluoride colloid is again dissolved to produce the fluoride ion, the particles of the organics are large in the case of sewage containing organics. Thus, the longer the running time utilizing an applied potential in excess of the decomposition potental of calcium fluoride, the greater is the probability of the fluoride ions colliding with and reacting with these particles. Thereby, if the organics are turned into fluorides, the polarization becomes very pronounced and the fluorides are aggregated and associated with each other and thus turn into precipitated particles.

A conventional electric process requires very great electric power as compared to the power requirements of the present invention. Consequently, with the conventional process, no clarifying effect can be obtained with direct current using the power requirements of the present invention which are, for example, from 10 amperes at 5 volts to 10 amperes at 10 volts for 30 minutes for each ton of treated water.

The pronounced advantages of the present process will be apparent from a consideration of the case of SiO₂. Silica has a propensity for aggregation to form an amorphous crystal, and is highly useful to promote the agglomeration of organics in the invention process, whereby the agglomerated organics settle out of the water.

Sodium, for example that produced from NaI, remains in the neighborhood of the cathode and provides a source of negative ions of idoine which help to remove the impurities from the polluted water. The decomposition by the application of electric potential results in the production of many ions from their compounds with consequent reaction with large molecules, especially molecules of organic matter. This is due to the fact that the probability of impact becomes higher, for evample, Ca⁺⁺, which is liberated repeatedly from its inorganic compounds, will become an organic compound and, finally, secondary colloidal inorganic matter.

The essence of the invention resides in the decomposition of the fluoride compounds to produce fluoride ions. If the voltage applied is less than the decomposition potential, the fluoride ion will combine with the calcium ion to produce calcium fluoride, and this will dissolve only 16 mg. per liter of water. The fluoride ion will not combine with the organics in the polluted water and, during the reversible reaction between calcium fluoride, Ca and F, at less than the decomposition potential, there is only a small probability of any impact with organics.

The aluminum electrode retains its initial thickness for a very long period due to the very small current density thereat. The permeable mesh holders for the pulverulent materials, and particularly in the case of the iodide ion, control the ionic diffusion by virtue of the very small mesh.

While specific embodiments of the invention have been shown and described in detail to illustrate the application of the principles of the invention, it will be understood that the invention may be embodied otherwise without departing from such principles.

What is claimed is:
1. A method of clarifying a polluted aqueous liquid by removing turbidity therefrom, said method comprising the steps of; immersing at least a pair of electrodes in the liquid in preselected spaced relation to each other; adding a fluoride compound to the liquid between the electrodes; applying, between electrodes, a unidirectional potential at least equal to the decomposition potential of the fluoride compound in water; the fluoride compound dissociating in the liquid, and the potential applied thereacross promoting said dissociation; the dissociation of the fluoride compound providing fluoride ions migrating to the positive electrode and reacting with organic and inorganic substances in the liquid to form highly polarized relatively solid compounds which tend to settle leaving substantially clear water.

2. A method of clarifying a polluted aqueous liquid, as claimed in claim 1, in which the positive electrode comprises a metal capable of forming hydrides.

3. A method of clarifying a polluted aqueous liquid, as claimed in claim 1, in which the positive electrode is formed of aluminum.

4. A method, as claimed in claim 2, including the step of packing the positive electrode with a pulverulent material comprising, as a principal constituent, potassium compounds and, as an additional constituent, a material selected from the group consisting of compounds of calcium, lead, barium and silicon, the packing being enclosed in a permeable fine mesh fibrous container.

5. A method of clarifying a polluted aqueous liquid, as claimed in claim 3, including the step of packing the positive electrode with a pulverulent material comprising, as a principal constituent, potassium compounds, and as an additional constituent, a material selected from the group consisting of compounds of calcium, lead, barium and silicon, the packing being enclosed in a permeable fine mesh fibrous container.

6. A method of clarifying a polluted aqueous liquid, as claimed in claim 1, in which said fluoride compound is immersed in the liquid by packing it around the negative electrode enclosed in a permeable fine mesh fibrous container.

7. A method of clarifying a polluted aqueous liquid, as claimed in claim 6, in whch said fluoride is sodium fluoride.

8. A method of clarifying a polluted aqueous liquid, as claimed in claim 6, in which said packing comprises sodium fluoride as a principal ingredient and an iodide as a secondary ingredient.

9. A method of clarifying a polluted aqueous liquid, as claimed in claim 1, in which said fluoride is calcium fluoride in an amount from 10 to 100 parts per million parts water.

10. A method of clarifying a polluted aqueous liquid, as claimed in claim 9, in which said calcium fluoride is provided in an amount from 10 to 30 parts per million parts of water.

References Cited

UNITED STATES PATENTS

| | | | |
|---|---|---|---|
| 404,180 | 5/1889 | Doremus | 210—62 |
| 1,095,893 | 5/1914 | Landreth | 204—149 |
| 1,705,589 | 3/1929 | Sanford | 210—62 |
| 1,956,411 | 4/1934 | Bonine | 204—149 |
| 2,580,809 | 6/1949 | Marks et al. | 210—62 |
| 3,078,225 | 2/1963 | Maier et al. | 210—62 |

HOWARD S. WILLIAMS, *Primary Examiner.*

T. TUNG, *Assistant Examiner.*